United States Patent
Costello et al.

(10) Patent No.: US 10,495,659 B2
(45) Date of Patent: Dec. 3, 2019

(54) SPEED AND POSITION SENSING SYSTEMS

(71) Applicant: Rolls-Royce Corporation, Indianapolis, IN (US)

(72) Inventors: John J. Costello, Indianapolis, IN (US); Andrew C. Pickard, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 155 days.

(21) Appl. No.: 15/804,561

(22) Filed: Nov. 6, 2017

(65) Prior Publication Data

US 2019/0137534 A1 May 9, 2019

(51) Int. Cl.
*G01P 3/44* (2006.01)
*G01P 1/00* (2006.01)

(52) U.S. Cl.
CPC . *G01P 3/44* (2013.01); *G01P 1/06* (2013.01)

(58) Field of Classification Search
CPC ..................................... G01P 3/44; G01P 1/06
USPC ...................................................... 73/514.39
See application file for complete search history.

(56) References Cited

U.S. PATENT DOCUMENTS

| | | | |
|---|---|---|---|
| 2,987,671 A | 6/1961 | Williams | |
| 4,506,339 A | 3/1985 | Kuhnlein | |
| 4,689,557 A | 8/1987 | Smith et al. | |
| 5,200,698 A | 4/1993 | Thibaud | |
| 5,508,608 A * | 4/1996 | Goossens | F16C 33/723 310/155 |
| 6,181,127 B1 | 1/2001 | Wallrafen | |
| 6,541,959 B2 | 4/2003 | Gudgeon et al. | |
| 6,650,106 B2 | 11/2003 | Daalmans et al. | |
| 6,885,187 B2 | 4/2005 | Duenisch et al. | |
| 2004/0061493 A1 | 4/2004 | Fishburn et al. | |
| 2013/0118856 A1 * | 5/2013 | Long | F16D 43/18 192/104 B |
| 2014/0028293 A1 | 1/2014 | Johnson et al. | |
| 2014/0266156 A1 | 9/2014 | Warner | |
| 2016/0334434 A1 | 11/2016 | Pickard et al. | |
| 2018/0088144 A1 * | 3/2018 | Hojo | G01P 3/488 |

FOREIGN PATENT DOCUMENTS

DE 3630062 A1 3/1988

* cited by examiner

*Primary Examiner* — Tarun Sinha
(74) *Attorney, Agent, or Firm* — Barnes & Thornburg LLP

(57) ABSTRACT

A sensor system includes a drum, a first sensor, and a second sensor. The drum is mounted for rotation about a rotation axis and includes a band and a plurality of members that extend axially away from the band. The first sensor and the second sensor are configured to generate electrical output in response to detecting one or more of the plurality of members.

20 Claims, 5 Drawing Sheets

SPEED AND POSITION SENSING SYSTEMS

FIELD OF THE DISCLOSURE

The present disclosure relates generally to sensing systems, and more specifically to sensing systems for detecting characteristics of rotating components of a gas turbine engine.

BACKGROUND

Sensor systems may be used to measure the rotational speed of mechanical components, such as turbines, shafts, or other components of gas turbine engines. Some sensor systems may include an exciter wheel and a magnetic sensor. However, such systems can produce compromised speed information when used in high speed or thermally dynamic environments.

SUMMARY

The present disclosure may comprise one or more of the following features and combinations thereof.

A sensor system may include a cylindrical drum, a first magnetic sensor, and a second magnetic sensor. The cylindrical drum may be mounted for rotation about a rotation axis. The cylindrical drum may include a band and a plurality of axially extending members arranged circumferentially about the rotation axis. The plurality of axially extending members may be adapted to deflect radially outward away from the rotation axis based on a rotational speed of the cylindrical drum.

The first magnetic sensor may be located radially within the cylindrical drum and may be aligned axially with the plurality of axially extending members. The first magnetic sensor may be configured to generate a first electrical output that indicates passage of each of the plurality of axially extending members about the first magnetic sensor when the cylindrical drum rotates about the rotation axis.

The second magnetic sensor may be located radially outside of the cylindrical drum and may be aligned axially with the plurality of axially extending members. The second magnetic sensor may be configured to generate a second electrical output that indicates passage of each of the plurality of axially extending members about the second magnetic sensor when the cylindrical drum rotates about the rotation axis.

In some embodiments, the sensor system further may include a controller configured to receive the first electrical output and the second electrical output. The controller may be configured to determine an axial position of the cylindrical drum based on at least one of the first electrical output and the second electrical output.

In some embodiments, the controller may be configured to generate an alert signal in response to the axial position of the cylindrical drum exceeding a predetermined position. In some embodiments, the controller may be configured to determine an axial position of the cylindrical drum based on the first electrical output and the second electrical output. In some embodiments, the controller may be configured to determine the rotational speed of the cylindrical drum based on the first electrical output and the second electrical output.

In some embodiments, the sensor system may include a controller configured to receive the first electrical output and the second electrical output. The controller may be configured to determine a rotation speed of the cylindrical drum based on at least one of the first electrical output and the second electrical output. The controller may be configured to generate an alert signal in response to the rotational speed of the cylindrical drum exceeding a predetermined threshold.

In some embodiments, the sensor system may include a controller configured to receive the first electrical output and the second electrical output. The controller may be configured to determine an axial travel range of the cylindrical drum based on at least one of the first electrical output and the second electrical output. The controller may be configured to generate an alert signal if the axial travel range exceeds a predetermined value.

In some embodiments, the first magnetic sensor and the second magnetic sensor are offset axially. In some embodiments, the first magnetic sensor and the second magnetic sensor are aligned axially.

According to another aspect of the present disclosure, a sensor system may include a drum, a first sensor, and a second sensor. The drum may be mounted for rotation about a rotation axis. The drum may include a band and a plurality of members that extend axially away from the band. The plurality of members may be arranged circumferentially about the rotation axis. The plurality of members may be free to deflect radially outward away from the rotation axis when the drum rotates about the rotation axis.

The first sensor may be aligned axially with the plurality of members. The first sensor may be configured to generate a first electrical output that indicates passage of each of the plurality of members relative to the first sensor when the drum rotates about the rotation axis. The second sensor may be configured to generate a second electrical output in response to detecting at least one of the plurality of members.

In some embodiments, the second sensor may include at least one of a proximity sensor and a contact-detection sensor. In some embodiments, the second sensor may be spaced apart axially from the plurality of members to locate the plurality of members outside of a detection range of the second sensor.

In some embodiments, the sensor system may include a controller configured to receive the second electrical output. The controller may be configured to generate an alert signal in response to receiving the second electrical output.

In some embodiments, the second sensor may include a magnetic sensor. The second sensor may be configured to generate the second electrical output that indicates passage of each of the plurality of members relative to the second sensor.

In some embodiments, the second sensor may be located radially outside of the drum. In some embodiments, the plurality of members may be located axially between the band and the second sensor.

In some embodiments, the sensor system may include a controller configured to receive the first electrical output and the second electrical output. The controller may be configured to determine an axial position of the drum based on at least one of the first electrical output and the second electrical output.

According to another aspect of the present disclosure, a method may include a number of steps. The method may include providing a drum including a band and a plurality of members that extend axially away from the band relative to a rotation axis, a first sensor aligned axially with the plurality of members, and a second sensor aligned axially with the plurality of members, generating a first electrical output indicative of passage of each of the plurality of members relative to the first sensor when the drum is rotated about the rotation axis, generating a second electrical output indicative of passage of each of the plurality of members relative to the second sensor when the drum is rotated about the rotation axis, and determining at least one of a rotational speed of the drum and an axial position of the drum based on at least one of the first electrical output and the second electrical output.

In some embodiments, the method may include determining the axial position of the drum and generating an alert signal in response to the axial position of the drum exceeding a predetermined position. In some embodiments, the method may include determining the rotational speed of the drum and generating an alert signal in response to the rotational speed of the drum exceeding a predetermined speed.

These and other features of the present disclosure will become more apparent from the following description of the illustrative embodiments.

DETAILED DESCRIPTION OF THE DRAWINGS

Figures 1, 2:
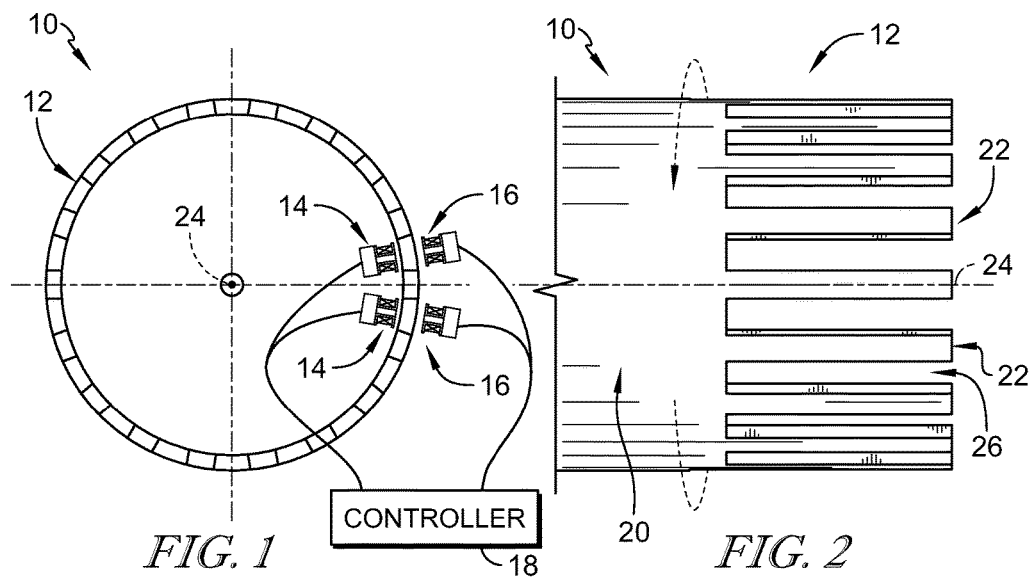
FIG. 1 is a front view of a sensor system in accordance with the present disclosure showing that the sensor system includes a drum mounted for rotation about a rotation axis of the sensor system and a plurality of sensors located adjacent the drum to determine one or more of an axial position and rotational speed of the drum about the rotation axis.
FIG. 2 is a side view of the sensor system of FIG. 1 showing that the drum includes a band and a plurality of axially extending members arranged circumferentially about the rotation axis.

For the purposes of promoting an understanding of the principles of the disclosure, reference will now be made to a number of illustrative embodiments illustrated in the drawings and specific language will be used to describe the same.

Figure 3:
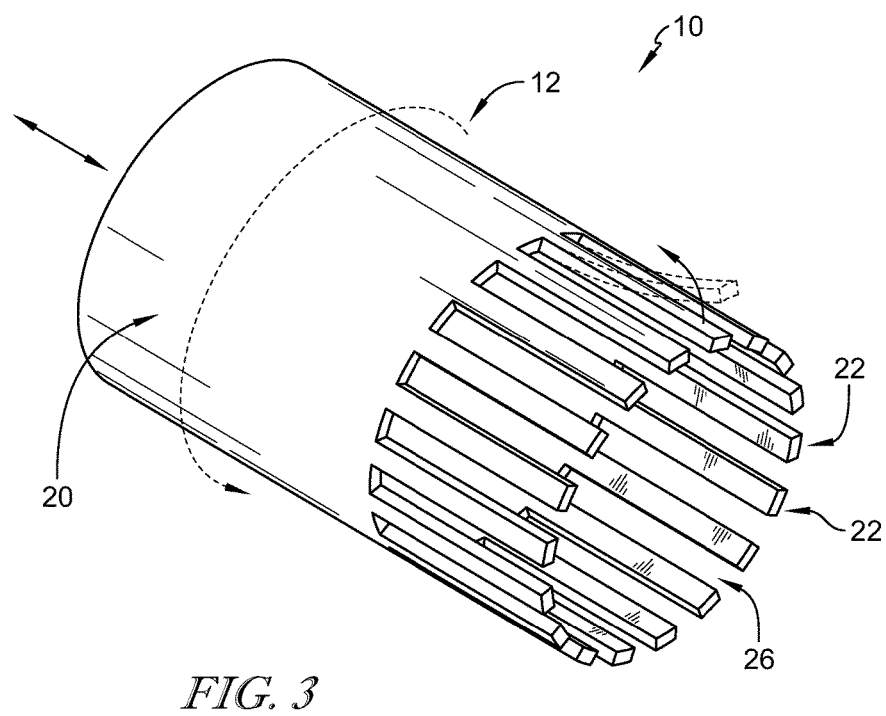
FIG. 3 is a perspective view of the sensor system of FIG. 1 suggesting that the plurality of axially extending members are configured to deflect radially outward in proportion to a rotational speed of the drum when the drum rotates about the rotation axis.

A sensor system 10 in accordance with the present disclosure is shown in FIGS. 1-3. The sensor system 10 is configured to determine one or more of an axial position and rotational speed of a rotating component in a gas turbine engine such as, for example, a shaft, compressor, or turbine.

The sensor system 10 includes a drum 12, a first sensor 14, a second sensor 16, and a controller 18 as shown in FIG. 1. The drum 12 is mounted to a rotating component of the gas turbine engine for rotation about a rotation axis 24 of the sensor system 10. The first and second sensors 14, 16 generate electrical output in response to detecting rotation of the drum 12. The controller 18 determines the rotational speed and/or axial position of the drum 12 based on the electrical output generated by the first and second sensors 14, 16. As shown in FIG. 1, the sensor system 10 may include a plurality of first and second sensors 14, 16.

Figure 4:
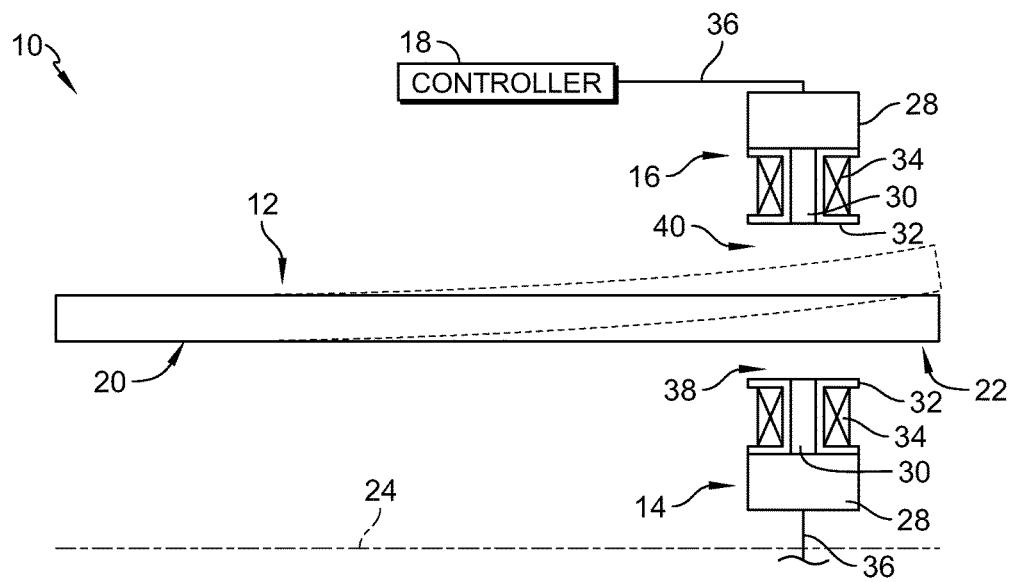
FIG. 4 is a diagrammatic and side view of the sensor system of FIG. 1 showing one of the plurality of axially extending members, a first magnetic sensor located radially inward of the axially extending member, and a second magnetic sensor located radially outward of the axially extending member and aligned axially with the first magnetic sensor.
Figure 5:
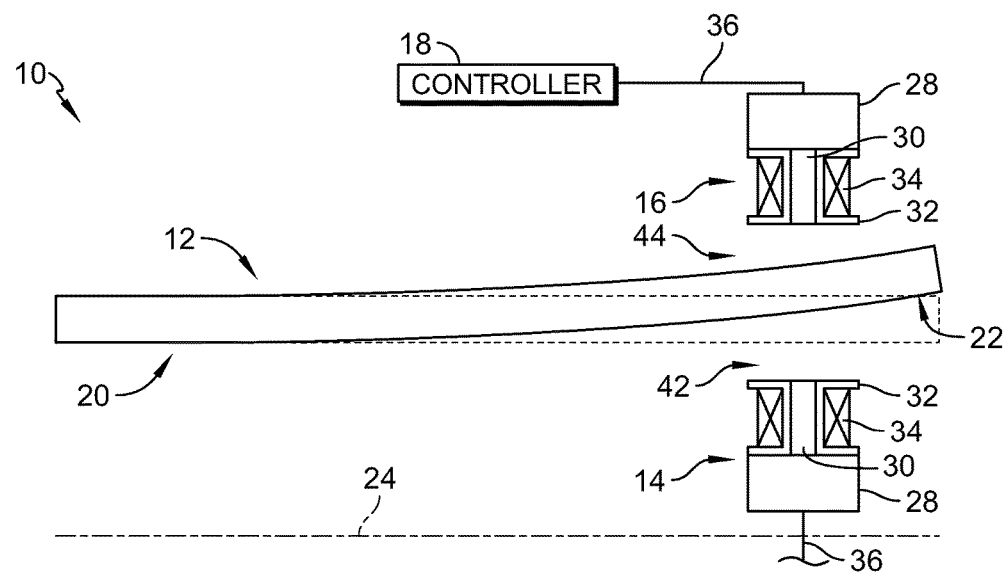
FIG. 5 is a diagrammatic and side view of the sensor system of FIG. 4 showing that the axially extending member has deflected radially outward away from the first magnetic sensor toward the second magnetic sensor in response to an increase in the rotational speed of the drum.

The drum includes a band 20 and a plurality of axially extending members 22 that extend away from the band 20 as shown in FIGS. 2. 2 and 3. The plurality of members 22 are configured to deflect radially outward away from the rotation axis 24 as a function of the rotational speed of the drum 12 as suggested in FIG. 3. As the rotational speed of drum 12 increases, the axially extending members 22 deflect radially outwards more due to centripetal loads as suggested in FIGS. 4 and 5. This outward deflection varies a size of air gaps 38, 40 between the sensors 14, 16 and the members 22, as shown in FIGS. 4 and 5. The drum 12 may move axially with the rotating component during operation which may also vary a size of the air gaps 38, 40 between the sensors 14, 16 and the members 22 as suggested in FIGS. 6 and 7.

Figure 10:
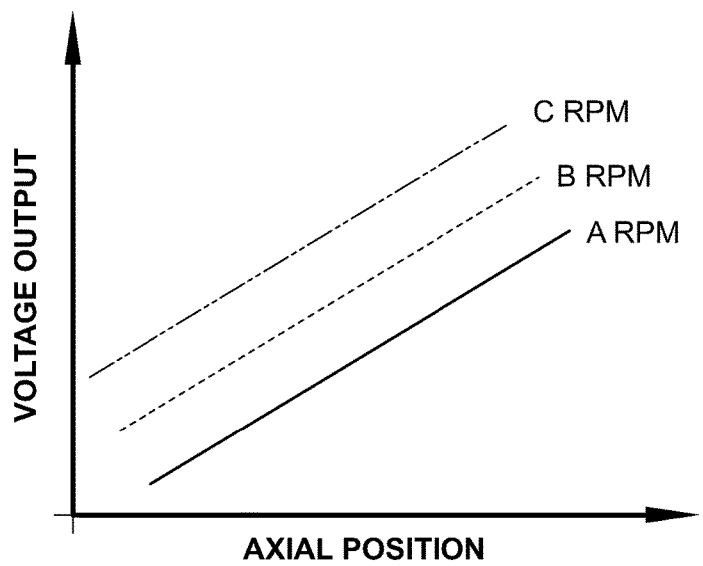
FIG. 10 is a plot showing the axial position of the drum and the voltage output of the first sensor included in the sensor system of FIG. 4.
Figure 11:
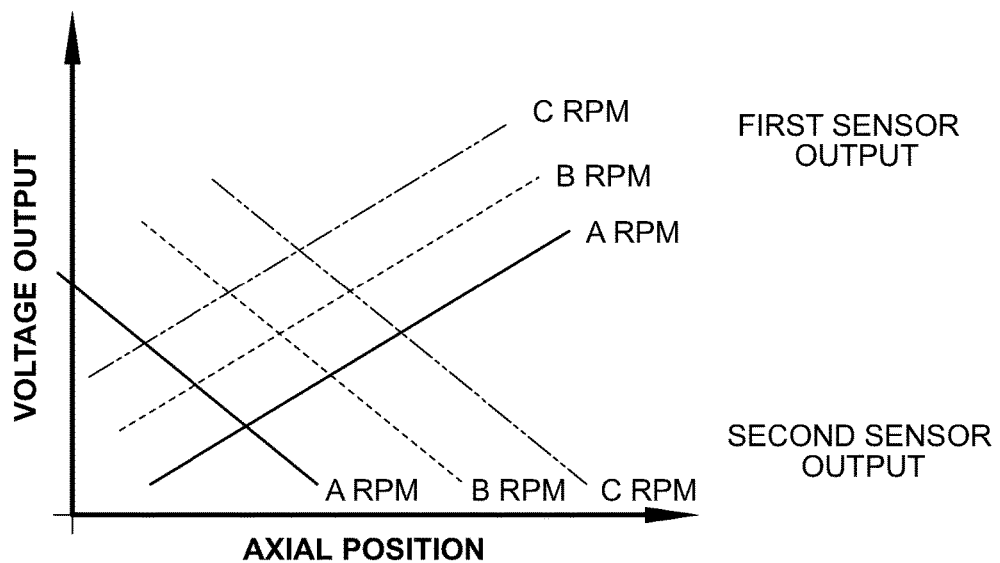
FIG. 11 is a plot showing the axial position of the drum and the voltage output of the first and second sensors included in the sensor system of FIG. 4.

The frequency of the electrical output generated by the sensors 14, 16 varies based on the rotational speed of the drum 12 and the magnitude of the electrical output varies based on the rotational speed of the drum and the size of the air gaps 38, 40 as suggested in FIGS. 10 and 11. The controller 18 is configured to determine the rotational speed of the drum based on the frequency of the electrical output generated by the sensors 14, 16.

The controller 18 is configured to determine the axial position of the drum 12 based on the frequency and magnitude of the electrical output. In some embodiments, the controller 18 uses plotted information of the axial position of the drum 12, the voltage output (magnitude) of the electrical output, and the determined rpm (revolutions per minute) of the drum 12 to determine the axial position of the drum 12.

The drum 12 is rotatable about the rotation axis 24 such that the plurality of members 22 move about the rotation axis 24 relative to the sensors 14, 16 as suggested in FIG. 1. For example, the drum 12 may be mounted to a shaft (not shown) that allows the drum 12 to rotate about the rotation axis 24 in a clockwise direction or a counterclockwise direction. In the illustrative embodiment, the drum 12 comprises ferromagnetic material. In some embodiments, the drum 12 comprises one or more of iron, nickel, and cobalt.

The drum 12 includes the band 20 (sometimes called a cylindrical region) and the plurality of members 22 (sometimes called a deflecting region) as shown in FIG. 3. In the illustrative embodiment, the drum 12 is a cylindrical drum having a circular cross section when viewed along the rotation axis 24 as shown in FIG. 1. The cylindrical drum 12 is formed to include notches 26 disposed between the members 22. The members 22 extend axially away from the band 20 and are disposed circumferentially around the cylindrical drum 12 about the rotation axis 24. The illustrative members 22 are cantilever members 22 and are configured to deflect radially outward. A first axial end of each member 22 is coupled to the band 20 and the second axial end of each member 22 is free.

The notches 26 are disposed between the axially extending members 22 in a circumferential direction, resulting in circumferential discontinuities about the cylindrical drum 12 as shown in FIG. 3. The notches 26 end at a boundary between the band 20 and the members 22, such that the band 20 has a substantially continuous cylindrical shape.

The first sensor 14 and the second sensor 16 comprise magnetic sensors 14, 16 in the embodiment shown in FIGS. 4 and 5. The sensors 14, 16 can be mounted to any suitable surface, and are preferably mounted to a surface that is stationary relative to the drum 12 as suggested in FIG. 1. In other embodiments, one or more of the sensors 14, 16 may comprise proximity sensors as suggested in FIGS. 8 and 9. The first sensor 14 is configured to generate a first electrical output and the second sensor 16 is configured to generate a second electrical output in response to detecting movement of a member 22 relative to the sensors 14, 16.

Each of the magnetic sensors 14, 16 includes a magnet 28, a center pole 30, a bobbin 32, a coil 34, and a transmission means 36. The center pole 30 extends away from the magnet 28. The bobbin 32 is arranged around the center pole 30. The coil 34 comprises metallic material and is arranged around the bobbin 32. The transmission means 36 is configured to transmit electrical output to the controller 18. The transmission means 36 includes a wire in the illustrative embodiment. In other embodiments, the transmission means 36 includes a wireless communication device.

The first magnetic sensor 14 is located radially inside of the drum 12 as shown in FIG. 4. The first magnetic sensor 14 is axially aligned with the plurality of members 22 relative to the rotation axis 24. The first magnetic sensor 14 is located relative to the plurality of members 22 such that the first magnetic sensor 14 detects the passage of the members 22 relative to the first magnetic sensor 14 when the drum 12 rotates about the rotation axis 24. The first magnetic sensor 14 is spaced apart from the members 22 in FIGS. 4 and 5.

The second magnetic sensor 16 is located radially outside of the drum 12 as shown in FIG. 4. The second magnetic sensor 16 is axially aligned with the plurality of members 22 relative to the rotation axis 24. The second magnetic sensor 16 is located relative to the plurality of members 22 such that the second magnetic sensor 16 detects the passage of the members 22 relative to the second magnetic sensor 16 when the drum 12 rotates about the rotation axis 24. The second magnetic sensor 16 is spaced apart from the members 22 in FIGS. 4 and 5. The second magnetic sensor 16 is aligned axially with the first magnetic sensor 14 in the illustrative embodiment as shown in FIGS. 4 and 5.

When the drum 12 rotates about the rotation axis 24, each of the members 22 and each of the notches 26 pass the magnetic sensors 14, 16 as suggested in FIG. 4. Upon passage of the members 22 relative to the magnetic sensors 14, 16, the members 22 modulate the magnetic flux in proximity of the coils 34. This modulates a voltage induced across the coils 34. For example, when a member 22 is aligned circumferentially with the center pole 30, as shown in FIG. 4, the voltage induced across the coil 34 may achieve a relative maximum. When a notch 26 is aligned circumferentially with the center pole 30, the voltage induced across the coil 34 may achieve a relative minimum.

The resulting voltage waveform can be processed to determine its frequency, which can be correlated to a rotational speed of the cylindrical drum 12. More particularly, a low-frequency voltage waveform generated by the magnetic sensors 14, 16 correlates to a lower rotational speed, and a high-frequency voltage waveform generated by the magnetic sensors 14, 16 correlates to a higher rotational speed.

The peak-to-peak voltage generated by the magnetic sensors 14, 16 may increase in response to an increased rotational speed of the drum 12 as suggested in FIG. 10. If the rotational speed of the cylindrical drum 12 increases, the members 22 deflect radially outwards, away from the rotation axis 24 due to increasing centripetal loads on the members 22 as suggested in FIG. 5. When the members 22 are in the deflected position, a first airgap 38 defined between the members 22 and the magnetic sensor 14 increase, reducing the voltage induced across the coil 34 of the first magnetic sensor 14. A second airgap 40 defined between the members 22 and the second magnetic sensor 16 decreases, increasing the voltage induced across the coil 34 of the second magnetic sensor 16.

The outward deflection of the members 22 thus provides voltage regulation functionality in response to increasing rotational speeds for the first magnetic sensor 14, avoiding high and potentially excessive voltage outputs that may occur in conventional sensor systems. Additionally, the second magnetic sensor 16 provides additional rotational speed information that may be used in conjunction with the information measured by the first magnetic sensor 14 to improve rotational speed accuracy as suggested in the plot shown in FIG. 11.

Because centripetal loads on the members 22 increase as the rotational speed of the cylindrical drum 12 increases, the members 22 will generally deflect farther away from the rotation axis 24 as the rotational speed of the cylindrical drum 12 continues to increase. Thus, the sensor system 10 provides additional voltage regulation automatically in response to continued increases in rotational speed of the cylindrical drum 12. The length, thickness, and/or width of the members 22 can be selected to obtain a desired relationship between deflection and speed. The size of the members 22 can be selected so that the members 22 deflect more or less for a given speed.

FIGS. 4 and 5 shows in more detail the manner by which deflection of the axially extending members 22 varies the air gaps 38, 40 between a member 22 and magnetic sensors 14, 16. In this example, the member 22 is aligned circumferentially with the center pole 30 of the magnetic sensors 14, 16 such that the voltage across the coils 34 is at a relative maximum.

When the cylindrical drum 12 is stationary, the member 22 does not deflect and assumes a substantially horizontal position as shown in FIG. 4. When the member 22 is in the substantially horizontal position, there exists static air gaps 38, 40 between the axially extending member 22 and the magnetic sensors 14, 16.

When the cylindrical drum 12 is rotating, the axially extending member 22 deflects radially outward due to centripetal loads and assumes the deflected position as shown in FIG. 5. When the axially extending member 22 is in the deflected position, there exists dynamic air gaps 42, 44. The dynamic air gap 42 defined between the member 22 and the first magnetic sensor 14 is larger than the static air gap 38 defined between the member 22 and the first magnetic sensor 14. The dynamic air gap 44 defined between the member 22 and the second magnetic sensor 16 is smaller than the static air gap 40 defined between the member 22 and the second magnetic sensor 16.

Because the voltage induced across the coils 34 is, in part, a function of the static air gaps 38, 40 and the dynamic air gaps 42, 44, the voltage induced across the coils 34 will vary when the members 22 assumes the deflected positions. This self-compensates for increased voltages in the magnetic sensors 14, 16 that may otherwise result in response to increasing rotational speeds of the drum 12.

At elevated rotational speeds, magnetic sensors of conventional sensor systems generate increasingly high peak-to-peak voltages that may ultimately exceed an appropriate operational range. In contrast, at elevated rotational speeds, one or more of the magnetic sensors 14, 16 of the sensor system 10 generate regulated peak-to-peak voltages that stay within an appropriate operational range for the sensor system 10.

In some conditions, the drum 12 (and/or the magnetic sensors 16) may be displaced along the rotation axis 24. For example, the drum 12 may experiences axial movement with the shaft relative to static gas turbine engine structure and a shaft location bearing. This axial displacement may arise due to a number of factors, such as mechanical imprecisions that amplify over time during operating conditions, thermal growth that occurs during operating conditions, and/or shaft failure. Due to the geometry of the drum 12 and the axially extending members 22, such axial displacement will generally not misalign the magnetic sensors 14, 16 from the axially extending members 22. Instead, axial displacement results in a differential air gap between the magnetic sensors 14, 16 and the axially extending members 22.

The sensor system 10 shown in FIGS. 4 and 5 is configured to determine the axial displacement based on the first and second electrical output. The controller 18 is configured to compare the expected voltage of the electrical outputs for a given rpm and determine the axial displacement based on any discrepancy between the expected voltage and the measured voltage.

Figure 6:
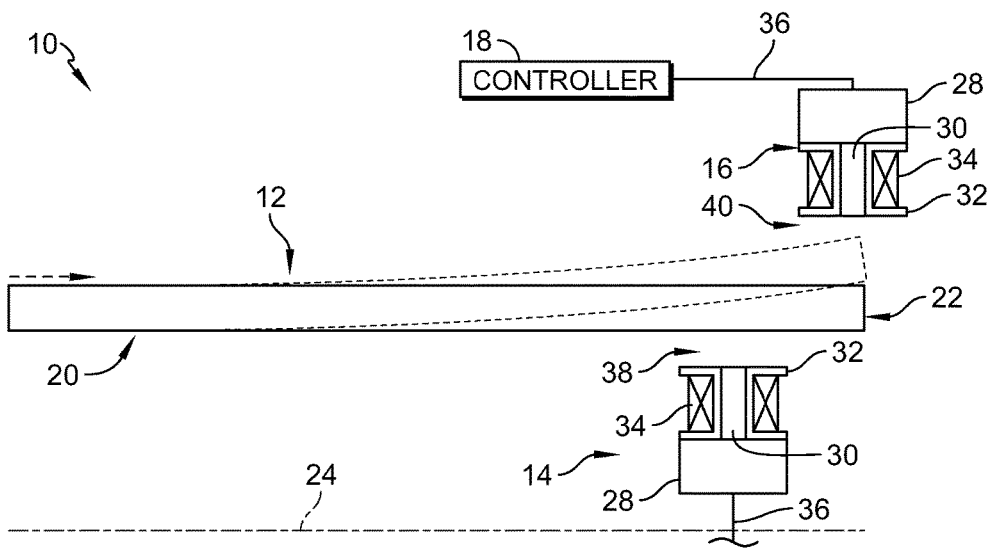
FIG. 6 is a diagrammatic and side view of another embodiment of the sensor system of FIG. 1 showing one of the plurality of axially extending members, the first magnetic sensor located radially inward of the axially extending member, and the second magnetic sensor located radially outward of the axially extending member and axially offset from the first magnetic sensor.
Figure 7:
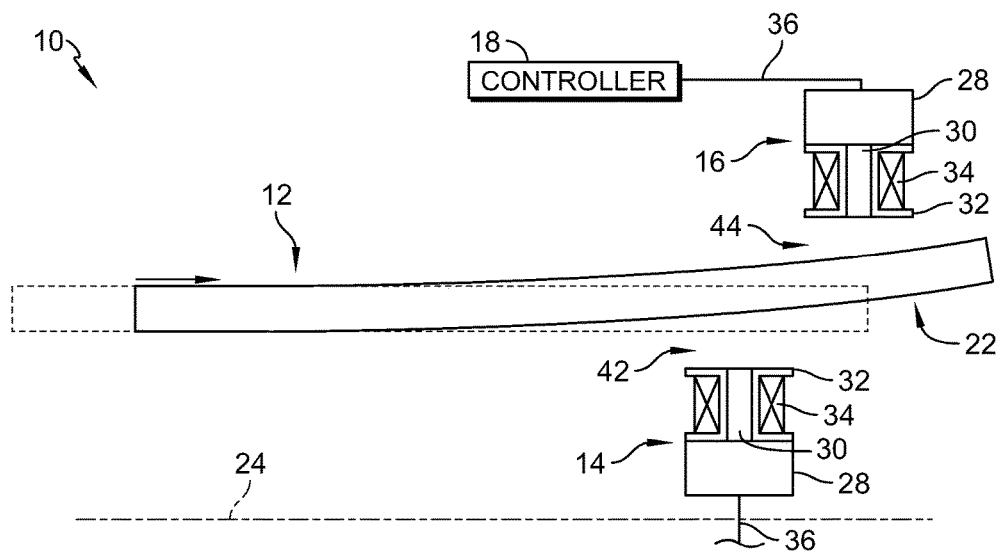
FIG. 7 is a diagrammatic and side view of the sensor system of FIG. 6 showing that the axially extending member moved axially to the right toward the second sensor and has deflected radially outward away from the first magnetic sensor toward the second magnetic sensor in response to an increase in the rotational speed of the drum.

One example of determining the axial displacement is suggested with the embodiment of the sensor system 10 shown in FIGS. 6 and 7. As shown in FIGS. 6 and 7, the second sensor 16 is axially aligned with the members 22 and axially offset relative to the first sensor 14. Such an arrangement of sensors 14, 16 may alter the curve mapping of the voltage output vs. rotational speed and of the voltage output vs. axial position. Such an offset sensor arrangement allows for rotational speed and axial position determination by the sensor system 10 similar to the arrangement shown in FIGS. 4 and 5. As such, the explanation of axial position determination by the sensor system 10 applies similarly to the sensor arrangement shown in FIGS. 4 and 5 and FIGS. 8 and 9.

FIG. 6 illustrates the drum 12 when it is not rotating. The drum 12 has a first axial position relative to the sensors 14, and 16. FIG. 7 illustrates the drum 12 displaced along the rotation axis 24 relative to the sensors 14, 16 in response to high rotation speeds, thermal growth, shaft failure, etc.

When the axially extending member 22 is deflected outward due to rotation speed and the drum 12 has been axially displaced, the size of the dynamic air gaps 42, 44 vary. The gap 42 between the member 22 and the first sensor 14 is relatively smaller compared to the drum 12 not being axially displaced. The gap 44 between the member 22 and the second sensor 16 is relatively larger compared to the drum 12 not being axially displaced.

Because the size of dynamic air gaps 42, 44 vary based on rotational speed and axial position of the drum 12, the voltage and frequency of the electrical outputs from the first and second sensors 14, 16 can be mapped so that one or both of the rotational speed and axial position of the drum 12 can be determined based on at least one of the first electrical output and the second electrical output.

The rotational speed measurements may be based on frequency of voltage waveforms rather than amplitude. As a result, the voltage difference caused by the air gaps 42, 44 when the drum 12 has moved axially as compared to the air gaps 42, 44 when the drum has not moved axially may not have a substantial impact on the speed-sending functionality of the sensor system 10.

To determine the axial position or displacement of the drum 12, the sensor system 10 may measure the frequency of the voltage waveform generated by the magnetic sensors 14, 16 to determine the rotational speed of the drum 12. Based on the determined rotational speed, the sensor system 10 may determine the expected peak-to-peak voltage of the voltage waveform generated by the magnetic sensor 16. For example, the curves of FIGS. 10 and 11 show illustrative expected peak-to-peak voltages for given rotational speeds.

As explained above, if the magnetic sensors 14, 16 and the drum 12 are axially displaced from one another, the air gap between them will vary, as illustrated in connection with the air gaps 42, 44 of FIG. 7. Changing the air gap may alter the peak-to-peak voltage generated by the magnetic sensors 14, 16 i.e., the measured peak-to-peak voltage for each of the first and second sensor 14, 16 may be higher than expected or may be lower than expected. The sensor system 10 can quantify the difference in measured voltage from the expected voltage, and correlate that difference in measured voltage to a determination of the amount of axial displacement.

The controller 18 is configured to receive the first electrical output generated by the first sensor 14 and the second electrical output generated by the second sensor 16 as suggested in FIGS. 1, 4, and 5. The controller 18 determines at least one of a rotational speed and the axial position of the drum 12 based on at least one of the first electrical output and the second electrical output.

The electrical output generated by the first and second sensors 14, 16 includes frequencies that are indicative of the rotational speed of the drum 12. The controller 18 determines the rotational speed of the drum 12 based on the frequency information of the first electrical output and the second electrical output. In some embodiments, the controller 18 makes its determination by weighing the first electrical output and the second electrical output. In some embodiments, the controller 18 uses one of the first electrical output and the second electrical output and verifies the determined rotational speed based on the other of the first electrical output and the second electrical output.

Illustrative plots of the axial position vs voltage of the sensor system 10 for different rpms are shown in FIGS. 10 and 11. As suggested in FIG. 10, the voltage generated by the first sensor 14 increases in response to the drum 12 moving axially to the right because a size of the gap 42 decreases. The curves further show that the voltage increases as rpm increase for a given axial position of the drum 12. The C rpm being greater than the B rpm being greater than the A rpm.

As suggested in FIG. 11, the voltage generated by the second sensor 16 decreases in response to the drum 12 moving axially to the right because a size of the gap 44 increases. The curves further show that the voltage generated by both sensors 14, 16 increases as rpm increase for a given axial position of the drum 12. The C rpm being greater than the B rpm being greater than the A rpm.

In some embodiments, the voltage varies with rpm of the drum 12 due to the deflection of the members 22. For example, at some rotational speeds, the voltage may decrease in response to a relative increase in rotational speed of the drum 12. The voltage and frequency of the electrical outputs can be mapped onto curves and the controller 18 can determine the rotational speed and/or axial position of the drum 12 by comparing the electrical output information with the mapped curve information. Axial position of the drum 12 may be determined without compromising the ability of the sensor system 10 to accurately measure rotational speed of the drum 12.

In response to detecting axial displacement, the controller 18 may generate an alert signal or notification through appropriate electrical signals indicating that axial displacement has occurred. In some embodiments, the controller 18 generates an alert signal in response to the axial position of the drum 12 exceeding a predetermined axial position. In response to detecting rotational speeds greater than a predetermined threshold, the controller 18 may generate an alert signal or notification through appropriate electrical signals.

In some embodiments, the controller 18 determines an axial travel range of the drum 12 based on at least one of the first electrical output and the second electrical output and generates an alert signal if the axial travel range exceeds a predetermined value. For example, the axial travel range may be the distance between an initial axial position of the drum 12 at assembly and an extreme most axial position of the drum 12 in one direction relative to the initial axial position. As another example, the axial travel range may be the distance between the drum 12 at a first extreme most axial position in one direction and a second extreme most axial position in a second direction opposite the first direction.

If axial displacement reaches a threshold where operation of the sensor system 10 may be compromised (e.g., where the magnetic sensors 14, 16 are in danger of being axially displaced entirely outside the range of the deflecting region), the controller 18 may generate an alert signal that may be transmitted to an operator or another controller that adjustments may be required such as reducing or shutting off fuel flow to the engine. Alternatively, the sensor system 10 may include automated mechanical components that automatically readjust positioning of the magnetic sensors 14, 16 and/or the drum 12 to maintain appropriate axial positioning in response to axial displacement measurements.

Figure 8:
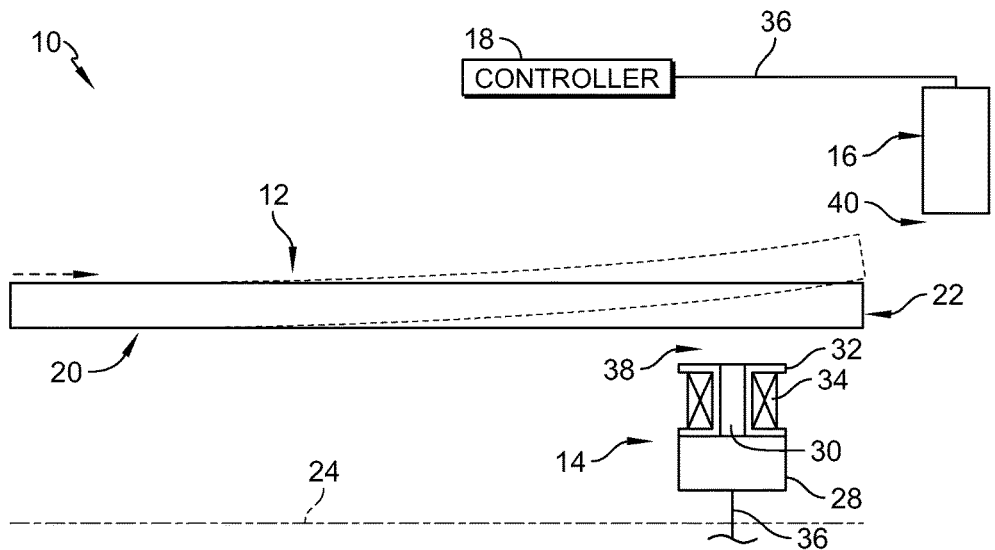
FIG. 8 is a diagrammatic and side view of another embodiment of the sensor system of FIG. 1 showing one of the plurality of axially extending members, a magnetic sensor located radially inward of the axially extending member, and a proximity detection sensor located radially outward of the axially extending member and showing that the proximity detection sensor is axially spaced apart from the axially extending members.
Figure 9:
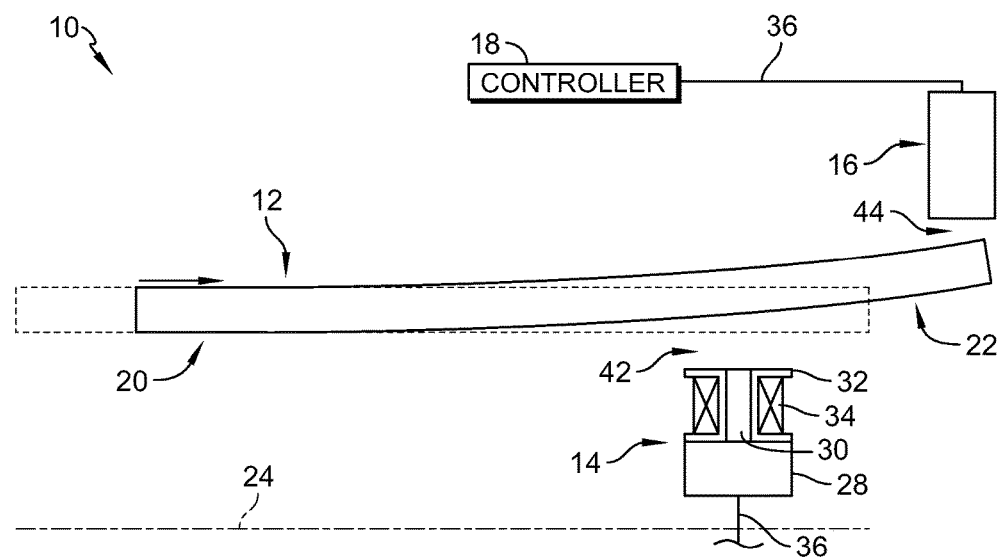
FIG. 9 is a diagrammatic and side view of the sensor system of FIG. 8 showing that the axially extending member has deflected radially outward and moved axially to the right toward the proximity detection sensor.

In some embodiments, the second sensor 16 acts as a proximity detector as shown in FIGS. 8 and 9. The second sensor 16 is spaced apart axially from the plurality of members 22 to locate the plurality of members 22 outside of a detection range of the second sensor 16 as shown in FIG. 8. The second sensor 16 is spaced apart axially from the members 22 by a predetermined distance.

The drum 12 is coupled to a rotational component of a gas turbine engine such as, for example, a shaft. During operation, the drum 12 may move axially due to one or more of increased rotational speed, thermal growth, component movement, shaft failure, etc. If the drum 12 moves axially relative to the second sensor 16 such that the members 22 enter a detection range of the second sensor 16, the second sensor 16 generates the second electrical output. The controller 18 is configured to receive the second electrical output and generate an alert signal in response to receiving the second electrical output. As an example, the alert signal indicates a shaft failure and stops a fuel flow of the engine.

In some embodiments, the second sensor 16 is spaced apart axially from the plurality of members 22 to locate the plurality of members 22 outside of a detection range of the second sensor 16 when the drum 12 is not rotating. In some embodiments, the second sensor 16 is spaced apart axially from the plurality of members 22 to locate the plurality of members 22 outside of a detection range of the second sensor 16 at the time that the sensor system 10 is assembled.

In some embodiments, the second sensor 16 includes at least one of a proximity sensor and a contact-detection sensor. In some embodiments, the second sensor 16 includes a magnetic sensor. In some embodiments, the first sensor 14 acts as a proximity detector.

The drum 12 may be fabricated from any suitable material that induces magnetic flux variations in proximity of the sensors 14, 16. In some embodiments, the drum 12 may be made of steel. The magnetic sensors 14, 16, including the magnets 28, the center poles 30, the bobbins 32, the coils 34, and transmission means 36 may be fabricated from any set of materials suitable for use in magnetic circuits.

The drum 12 may be fabricated such that the axially extending members 22 undergo predetermined amounts of deflection at given rotational speeds. If a thickness of the members 22 is reduced, the members 22 may deflect more readily, providing increased voltage regulation functionality. Similarly, if a more pliable material is selected for fabrication of the drum 12, the members 22 may deflect more readily, providing increased voltage regulation functionality.

Dimensions and relative positioning of the drum 12 and the sensors 14, 16 may vary and may be tailored based on an application at hand. In illustrative embodiments, the sensor system 10 is used to measure rotational speed and axial position of mechanical components in a gas turbine engine (e.g., rotational speed of turbines, shafts, etc.).

It may be desirable to accurately measure the speed of rotative components of turbomachinery used in aerospace and other industries. The precise measurement of speed may be desired to ensure the various engine stations, e.g. compressor or turbine blades, do not transition into over-speed conditions that would result in over stressed shafts, disks or blades that could break or rupture and jeopardize safe operation. Further, in the event of a shaft break it may be desirable to continue to monitor speed, discontinue fuel delivery, and ensure it is possible to shut down the engine to eliminate any potentially hazardous event from occurring.

Under high speed and high power operation, the shaft may be displaced axially as suggested in FIG. 7. In the case of very high speed operation or shaft break, it is possible for the shaft to move out of range of a typical sensor system. Under these conditions, the voltage output generated from the typical sensor system may decrease exponentially as a function of distance from the magnetic target. In one example, after a displacement of 4 to 5 millimeters, the signal amplitude from the speed sensor may decrease by more than 50 percent.

The voltage output from the sensors may decrease and may decay to a null value as the distance to the magnet target increases. If this occurs, the control system may be unable to effectively respond as the speed signal is no longer of sufficient amplitude to be useful. In this case, the associated rotative components may continue to increase in speed and the fuel delivery will continue. With this operational scenario, the engine may transition into an over-speed mode of operation, where either the disks or blades may be damaged, potentially resulting in release of one or more blades from the disk.

To improve the fidelity of the speed measurement system under high power or shaft break conditions, the sensor system 10 in accordance with the present disclosure is provided. The sensor 14 may be located on the inside diameter of the drum 12. Further, the drum 12 includes fingers 22 to complete the ferromagnetic circuit for generating the output voltage signal. FIG. 4 shows a cross sectional view of the assembly and one approximate axial alignment of the variable reluctance sensor 14 relative to the exciter fingers 22. The exciter fingers 22 may be designed to optimize the centrifugal displacement as a function of speed. In this example, the fingers of the drum 12 are approximately 25 millimeters in length and can achieve a radial displacement of approximately 4 millimeters at a speed of 20,000 rpm. The material, length, thickness, and/or width of the members 22 can be selected to obtain a desired relationship between deflection and speed. For example, the size of the members 22 can be selected so that the members 22 deflect more or less for a given speed.

In this illustrative operational scenario, the exciter fingers 22 deflect outward as a function of the speed. Depending on the material properties of the exciter drum 12 and the aspect ratio of the exciter fingers 22, the elastic deflection can range from 1 to 5 millimeters. In addition to the elastic behavior of the exciter fingers 22, the shaft and drum 12 may also have shifted axially forward by several millimeters as well.

The output voltage from the reluctance sensor 14 will be a function of speed and also the airgap. As noted, under high speed or high power operation there may be variation in both the axial position of the shaft and drum 12 and also the airgap.

Under typical operation with a small amount of axial shaft movement, the output voltage from the reluctance sensors 14 is self-regulating. In one example, the airgap dynamically varies from about one half millimeter at rotational speeds of 1,000 rpm to about 4 millimeters at speeds of 20,000 rpm. With a transition of the engine into a higher power mode of operation, the shaft may move axially forward relative to the sensor 14 by several millimeters. Depending on the distance of the axial alignment, the effective airgap will range from about one half to about 2 millimeters in some examples and the output voltage from the sensor may increase by 3 times to 5 times in amplitude. The output voltage from the sensor 14 may increase from about 3 to 5 Volt peak to peak to 10 to 30 Volt peak to peak. This transition in output voltage amplitude can be identified as one of the possible means of over-speed annunciation to the engine control scheme. In the event the shaft moves farther than a few millimeters during an over-speed or shaft break scenario, this configuration allows for 10 to 15 millimeters of monitoring distance to capture the realignment of the shaft relative to the stationary reluctance sensor.

In some embodiments, a dual redundant system is used with the reluctance sensor output and a second proximity sensor. Under high power or an over-speed operating condition, the shaft and drum 12 may move forward and both sensor outputs will be annunciated to alert the engine control system of a potentially dangerous over-speed condition. In an alternative, a proximity sensor is used as shown in FIGS. 8 and 9.

In some embodiments, the integration of another variable reluctance sensor to monitor the speed on the outer diameter of the exciter drum is used. In this implementation, the voltage output from reluctance sensors 14 and 16 could be monitored individually or differentially to annunciate the engine control system of an over-speed or shaft-break condition. The second variable reluctance sensor 16 may exhibit higher output voltage as the exciter drum moves closer axially during high speed or high power operation. In other embodiments, the two sensors produce a differential output that can be used to more accurately locate the shaft axially between the two sensors.

A sketch of the possible mapping of the sensor data is shown in FIG. 10. This figure notes the axial position vs voltage for a family of different operating speeds. In this sketch, the speed C is greater than B is greater than A in rpm. For example, the output voltage of Sensor 14 may be a function of rpm and airgap as noted here. As can be visualized, a similar type of differential mapping can be generated with the two sensor arrangement noted in FIG. 11 for improved positional accuracy.

The sensor systems described herein offers a number of benefits over the legacy measurement system. One benefit may include over-speed detection and monitoring. One benefit may include dual or multiple redundancy features for safety and annunciation to engine control unit to disable fuel delivery. Possible use for surge detection because one could measure axial shift of 1 to 2 millimeters to predict surge events. One benefit may include shaft break detection. One benefit may include longer engagement with shaft than a tone wheel. A reluctance sensor systems may be based on exciter drum design of 10 to 20 millimeters for exciter finger length One benefit may include, engine health monitoring because one could measure movement of shaft when location bearing transitions through a zero axial load condition, which is an indication of potential bearing damage due to skidding. One benefit may include mapping of the shaft Position vs speed and output voltage for health monitoring. One benefit may include a lower cost than more complicated electronic systems, e.g. microwave or optical speed measurement systems. The sensor system may monitor one or more of a rotational speed and axial position of the drum and may provide multiple levels of redundancy in hardware that may have previously been addressed with software.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A sensor system comprising
   a cylindrical drum mounted for rotation about a rotation axis, the cylindrical drum including a band and a plurality of axially extending members arranged circumferentially about the rotation axis and the plurality of axially extending members adapted to deflect radially outward away from the rotation axis based on a rotational speed of the cylindrical drum,
   a first magnetic sensor located radially within the cylindrical drum and aligned axially with the plurality of axially extending members, the first magnetic sensor configured to generate a first electrical output that indicates passage of each of the plurality of axially extending members about the first magnetic sensor when the cylindrical drum rotates about the rotation axis, and a second magnetic sensor located radially outside of the cylindrical drum and aligned axially with the plurality of axially extending members, the second magnetic sensor configured to generate a second electrical output that indicates passage of each of the plurality of axially extending members about the second magnetic sensor when the cylindrical drum rotates about the rotation axis, wherein the deflection of the axially extending members operates to vary voltage outputs of the first and second magnetic sensors.

2. The sensor system of claim 1, further comprising a controller configured to receive the first electrical output and the second electrical output and to determine an axial position of the cylindrical drum based on at least one of the first electrical output and the second electrical output.

3. The sensor system of claim 2, wherein the controller is configured to generate an alert signal in response to the axial position of the cylindrical drum exceeding a predetermined position.

4. The sensor system of claim 2, wherein the controller is configured to determine an axial position of the cylindrical drum based on the first electrical output and the second electrical output.

5. The sensor system of claim 2, wherein the controller is configured to determine the rotational speed of the cylindrical drum based on the first electrical output and the second electrical output.

6. The sensor system of claim 2, further comprising a controller configured to receive the first electrical output and the second electrical output and to determine a rotation speed of the cylindrical drum based on at least one of the first electrical output and the second electrical output and to generate an alert signal in response to the rotational speed of the cylindrical drum exceeding a predetermined threshold.

7. The sensor system of claim 1, further comprising a controller configured to receive the first electrical output and the second electrical output, determine an axial travel range of the cylindrical drum based on at least one of the first electrical output and the second electrical output, and generate an alert signal if the axial travel range exceeds a predetermined value.

8. The sensor system of claim 1, wherein the first magnetic sensor and the second magnetic sensor are offset axially.

9. The sensor system of claim 1, wherein the first magnetic sensor and the second magnetic sensor are aligned axially.

10. A sensor system comprising
a drum mounted for rotation about a rotation axis, the drum including a band and a plurality of members that extend axially away from the band, the plurality of members arranged circumferentially about the rotation axis, and the plurality of members being free to deflect radially outward away from the rotation axis when the drum rotates about the rotation axis,
a first sensor aligned axially with the plurality of members, the first sensor configured to generate a first electrical output that indicates passage of each of the plurality of members relative to the first sensor when the drum rotates about the rotation axis, and
a second sensor configured to generate a second electrical output in response to detecting at least one of the plurality of members,
wherein the deflection of the axially extending members operates to vary voltage outputs of the first and second sensors.

11. The sensor system of claim 10, wherein the second sensor includes at least one of a proximity sensor and a contact-detection sensor.

12. The sensor system of claim 11, wherein the second sensor is spaced apart axially from the plurality of members to locate the plurality of members outside of a detection range of the second sensor.

13. The sensor system of claim 11, further comprising a controller configured to receive the second electrical output and to generate an alert signal in response to receiving the second electrical output.

14. The sensor system of claim 10, wherein the second sensor includes a magnetic sensor configured to generate the second electrical output that indicates passage of each of the plurality of members relative to the second sensor.

15. The sensor system of claim 10, wherein the second sensor is located radially outside of the drum.

16. The sensor system of claim 15, wherein the plurality of members are located axially between the band and the second sensor.

17. The sensor system of claim 10, further comprising a controller configured to receive the first electrical output and the second electrical output and to determine an axial position of the drum based on at least one of the first electrical output and the second electrical output.

18. A method comprising
providing a drum including a band and a plurality of members that extend axially away from the band relative to a rotation axis, a first sensor aligned axially with the plurality of members, and a second sensor aligned axially with the plurality of members, the plurality of members being free to deflect radially outward away from the rotation axis when the drum is rotated about the rotation axis,
generating a first electrical output indicative of passage of each of the plurality of members relative to the first sensor when the drum is rotated about the rotation axis, the first electrical output varying in response to deflection of the plurality of members,
generating a second electrical output indicative of passage of each of the plurality of members relative to the second sensor when the drum is rotated about the rotation axis, the second electrical output varying in response to deflection of the plurality of members, and
determining at least one of a rotational speed of the drum and an axial position of the drum based on at least one of the first electrical output and the second electrical output.

19. The method of claim 18, further comprising determining the axial position of the drum and generating an alert signal in response to the axial position of the drum exceeding a predetermined position.

20. The method of claim 18, further comprising determining the rotational speed of the drum and generating an alert signal in response to the rotational speed of the drum exceeding a predetermined speed.

* * * * *